United States Patent
Horst et al.

(10) Patent No.: US 7,244,172 B2
(45) Date of Patent: Jul. 17, 2007

(54) POULTRY INCAPACITATOR AND METHOD OF USE

(75) Inventors: Drew Horst, Lampe, MO (US); Edgar Garcia-Rill, Little Rock, AR (US)

(73) Assignee: Middleton, Inc., Hollister, MO (US)

( * ) Notice: Subject to any disclaimer, the term of this patent is extended or adjusted under 35 U.S.C. 154(b) by 260 days.

(21) Appl. No.: 11/026,932

(22) Filed: Dec. 31, 2004

(65) Prior Publication Data

US 2006/0286914 A1 Dec. 21, 2006

Related U.S. Application Data

(60) Provisional application No. 60/533,489, filed on Dec. 31, 2003.

(51) Int. Cl.
*A22B 3/06* (2006.01)
(52) U.S. Cl. ....................................................... 452/58
(58) Field of Classification Search .............. 452/57–60
See application file for complete search history.

(56) References Cited

U.S. PATENT DOCUMENTS

| | | | | |
|---|---|---|---|---|
| 1,599,134 | A | * | 9/1926 | King ............................. 452/54 |
| 4,153,971 | A | * | 5/1979 | Simonds ....................... 452/59 |
| 4,875,253 | A | * | 10/1989 | Lambooy ..................... 452/58 |
| 4,953,263 | A | * | 9/1990 | Lambooy ..................... 452/58 |
| 5,888,132 | A | * | 3/1999 | Burnett ....................... 452/141 |
| 5,899,802 | A | * | 5/1999 | Burnett ....................... 452/141 |
| 6,338,673 | B2 | * | 1/2002 | Berry et al. .................. 452/58 |
| 6,471,576 | B1 | * | 10/2002 | Ross ............................ 452/58 |

* cited by examiner

*Primary Examiner*—Thomas Price
(74) *Attorney, Agent, or Firm*—Lathrop & Gage LC

(57) ABSTRACT

The invention relates to a method for rendering fowl insensate prior to killing and processing by exposing the fowl to a radio frequency source producing a frequency from between approximately 5 gigahertz and approximately 40 gigahertz and with an average power density from between approximately 10 milliwatts per square centimeter and approximately 100 milliwatts per square centimeter for a predetermined period of time.

20 Claims, 3 Drawing Sheets

POULTRY INCAPACITATOR AND METHOD OF USE

CROSS REFERENCE TO RELATED PROVISIONAL PATENT

This non-provisional application claims priority of the provisional application No. 60/533,489 filed on Dec. 31, 2003.

FIELD OF THE INVENTION

The present invention generally relates to a device and method utilizing radio frequencies (microwaves) for incapacitating poultry prior to decapitation, other slaughter methods, or during the processing of the poultry such as feather removal.

BACKGROUND OF THE INVENTION

Humane treatment of animals prior to processing for food purposes has long been an important issue to animal rights groups, government agencies and consumers. Automated equipment has been developed to speed the processes used for killing and processing animals in commercial settings. This is particularly the case in poultry processing facilities where animals are typically suspended from a shackle line or similar conveyance assembly and mechanically transported through each of the processing steps.

Historically, animals were "live killed" meaning that they were not stunned or incapacitated in any manner. Because rendering an animal unconscious or otherwise incapacitating it prior to killing makes processing easier and clearly more humane, a variety of devices and methods have been developed to facilitate this processing step. Examples of methods commonly employed to render animals insensate include gassing, chemical exposure, electric shock, and blunt force. Each of these methods have problems, including a relatively high incidence of failure in that not all of the animals are successfully incapacitated and some are actually killed or wounded by the incapacitation process. Moreover, each of these methods may result in damaging some of the animals to an extent that would cause them to be unfit for human consumption. The known methods can result in lost profits for the processor due to rework, downgrading or the poultry or outright loss of product.

A stated goal within the poultry processing industry is that a minimum of 98 percent of birds be effectively stunned, with the bird being rendered insensate, at the time of killing. Achieving this goal utilizing known and existing methods is extremely difficult if not impossible.

It is therefore desirable to provide an effective, safe and humane method for incapacitating animals, particularly poultry, prior to slaughter. The instant invention overcomes the limitations and problems particular to the previously known methods, as identified above and commonly known in the industry.

BRIEF DESCRIPTION OF THE DRAWING

The invention is illustrated using the following FIGURES along with the detailed description of the invention.

DETAILED DESCRIPTION OF THE INVENTION

Figure 1:
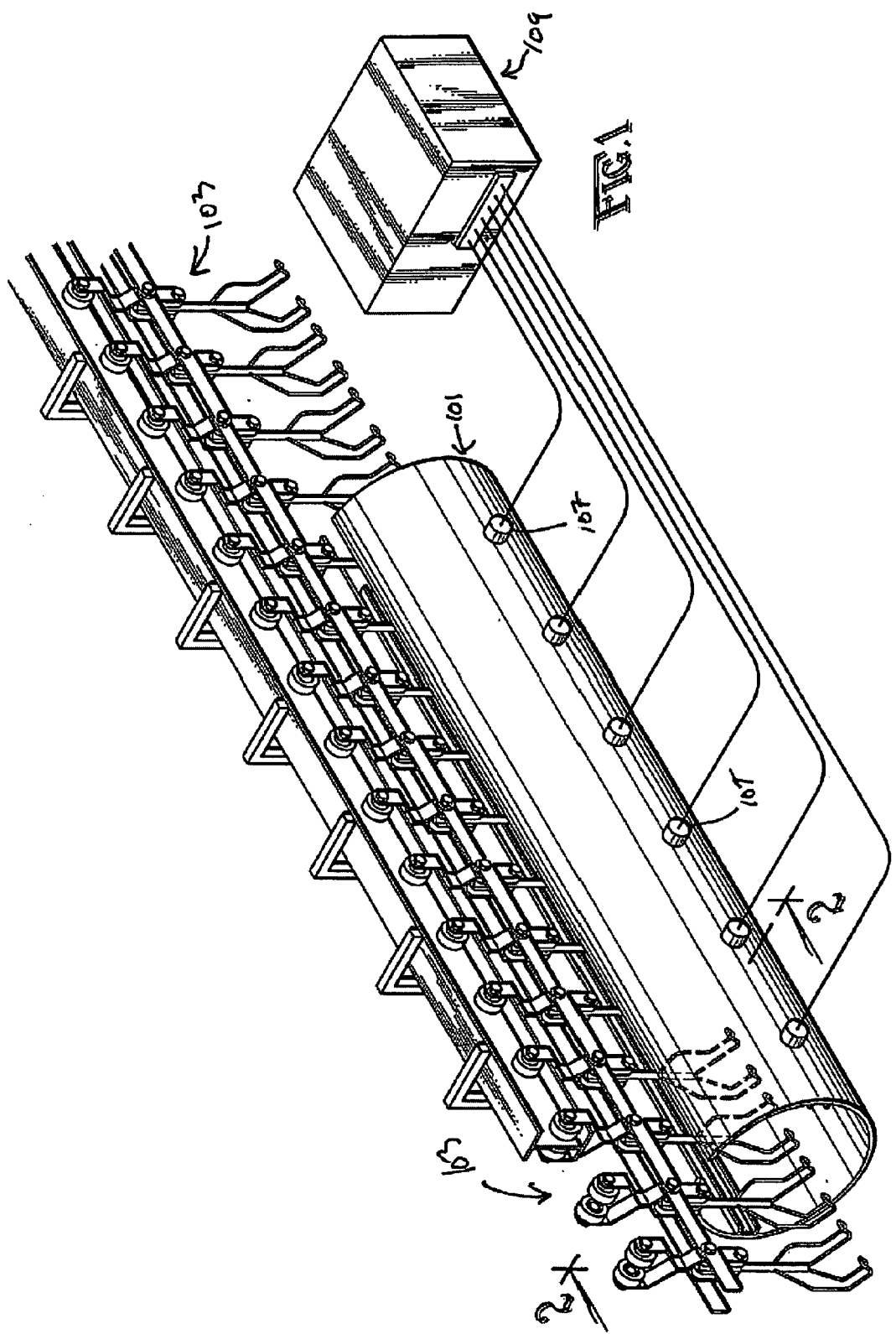
FIG. 1 is a perspective view of a poultry processing line incapacitator.
Figure 2:
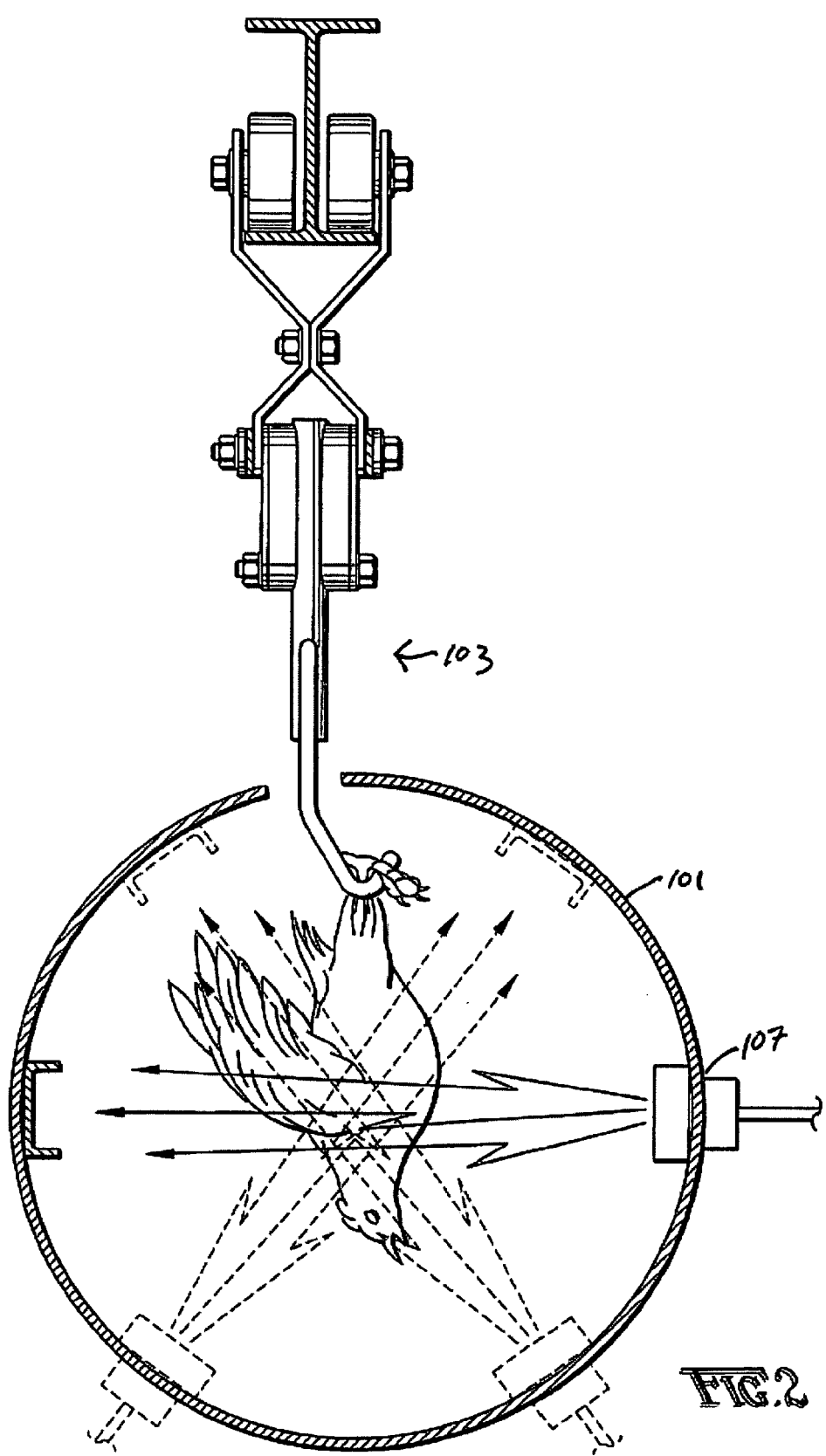
FIG. 2 is a cross-sectional view of an embodiment of a poultry processing line incapacitator.
Figure 3:
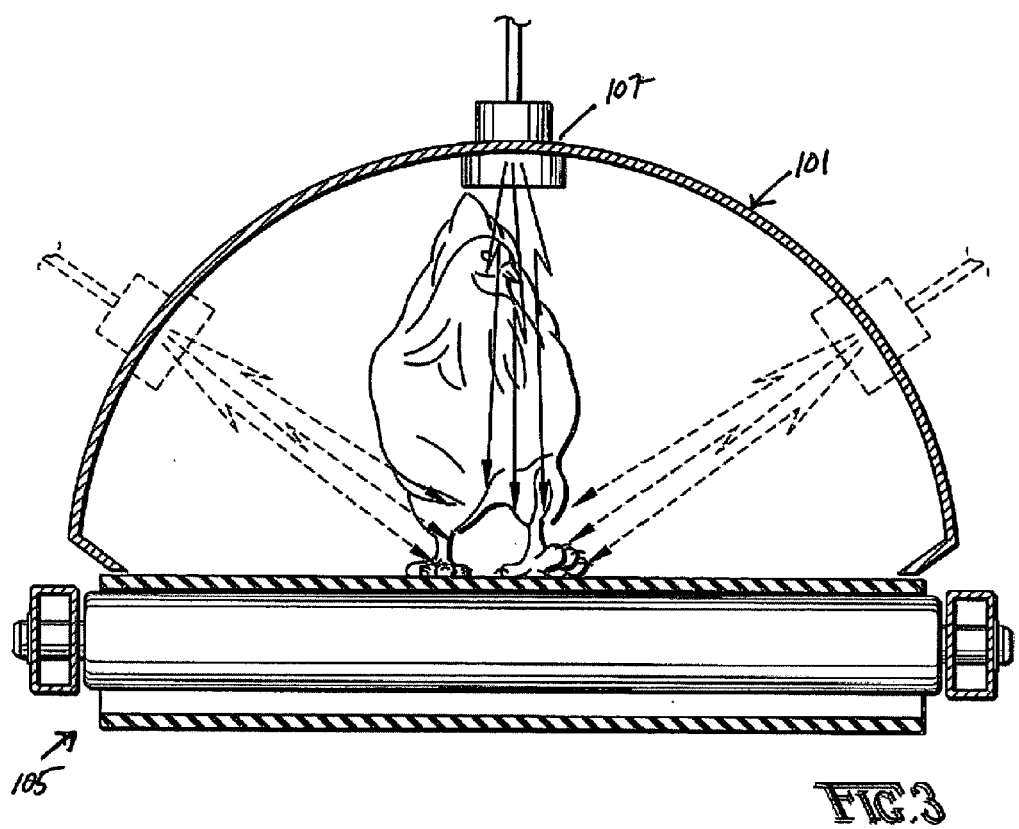
FIG. 3 is a cross-sectional view of an embodiment of a poultry processing line incapacitator.

The present invention relates to a new device and method or process for incapacitating or stunning animals prior to killing during the slaughtering process.

In this particular embodiment of the invention, microwave radio frequency signals are transmitted along field guiding structures which limit the signal transmission range. Exposure of poultry to specific radio frequencies over a period of time will render the animal insensate. Animals are suspended upside down and conveyed along a shackle line with their bodies passing through the field guiding structures which will preferably be metallic trough.

In another embodiment of the invention, the same method or process of exposing the animal's body to radio frequencies while the animals are standing or resting on a surface, such as a conveyor, with the RF signals transmitted generally downward towards the head or from the side towards the body and head. In such applications, the use of parallel plate guides represent an alternative method of transmission to the trough or tube.

The trough or tube should have at least one port through which RF (radio frequency) signals can be coupled into the field guiding structure through the use of antennas, apertures, probes, wires, or other methods commonly practiced in the art of microwave RF design. These ports are connected to the source of the RF signals through guiding structures that are known as waveguides but could include other well known structures suitable for guiding electromagnetic waves at the frequencies described below. It may be beneficial to place a cylindrical resonator within the mechanical trough prior to passing radio frequency along the trough to decrease the required operational power. Further, apertures may be formed in at least one of the parallel guiding plates with a single radio frequency transmitter to convey power to the apertures through the use of microwave power splitters. The overhead conveying system will be grounded to the tube to prevent electrical arcing which would result in undesired heating of the conveying system.

It is preferable that the trough be constructed from a highly conductive metal. It may be necessary and preferred to curve the sides of the trough, dependent upon the parameters of the power generation, exposure time and the like. It is also preferred that the trough is either coated with an easily cleaned surface or provided with a shield that can be removed for cleaning. In another embodiment, the trough may be configured similar to a tube, either fully or partially enclosed.

The RF power may be supplied by a klystron, magnetron, or similar device consistent with the peak power rating, pulse repetition frequency and duty cycle and RF frequency. A frequency range of from between 5 (gigahertz) Ghz to 40 Ghz can operatively incapacitate the fowl, depending on power density. The preferred RF frequency is approximately 16 Ghz which is typical of Ku band microwave applications. The peak power rating is in the range of 10 kilowatts (kW) to 100 kW, preferably 60 kW with an average power in the range of 20 W to 200 W, preferably 100 W. It is understood that power ratings may differ depending on the usable configuration of the RF power supply. The preferred pulse frequency will be approximately 8400 Hz+/−2500 Hz, with a pulse duration of approximately 0.20 microseconds. This is commensurate with a duty cycle of approximately 0.2%.

Magnetron tubes consistent with the above specifications are commercially available and are manufactured, for example, by CPI Wireless Solutions of Beverly, Mass. An exposure energy density of between 150 milliwatts (mW) seconds per square centimeter and 350 mW seconds per square centimeter is sufficient to produce some observable effect in the animals at a power density of 45 mW per square centimeter.

The exposure time at this power level is in the range of 3–30 seconds, but should render the animal insensate in approximately 2 to 10 seconds.

In one embodiment of the inventive method, the following parameters are preferred: a radio frequency from between approximately 5 Ghz and approximately 40 Ghz and with an average power density from between approximately 10 mW per square centimeter and approximately 100 mW per square centimeter produced and concentrated within and/or around a field guiding structure, such as the above-described trough. A fowl's complete body is then exposed to the radio frequency, by placing the head adjacent to or within the field guiding structure for a period of time from between approximately 3 seconds and approximately 30 seconds. In the preferred embodiment, the radio frequency is produced from a magnetron operable within the Ku band. In a second embodiment, the head of the standing and/or conveyed animal is exposed from above or the sides with similar effects. In cases in which repeated exposure is desired, the waveguides can be split to provide RF at multiple points along the trough or tube, or multiple magnetrons can be used in series to provide RF exposure at multiple points along the trough or tube.

It will be apparent to those skilled in the art that various modifications and variations can be made in the system and method of the present invention without departing from the spirit or scope of the invention. The present invention covers the modifications and variations of this invention provided they come within the scope of the appended claims and their equivalents.

What is claimed is:

1. A method for rendering fowl insensate, further comprising the step of exposing the fowl to a radio frequency source producing a frequency from between approximately 5 gigahertz and approximately 40 gigahertz and with an average power density from between approximately 10 milliwatts per square centimeter and approximately 100 milliwatts per square centimeter.

2. The method of claim 1 wherein the fowl is exposed to the radio frequency source for between approximately 3 seconds and approximately 30 seconds.

3. The method of claim 2 wherein the radio frequencies are directed at the head of the fowl.

4. The method of claim 1 wherein the radio frequencies are concentrated within and surrounding a field guiding structure.

5. The method of claim 4 wherein the radio frequencies are concentrated between parallel plate guides and nearby surrounding space.

6. The method of claim 1 wherein the radio frequency source is a magnetron.

7. The method of claim 6 wherein the magnetron generates frequencies within the Ku band.

8. A method for rendering fowl insensate, comprising the steps of:
generating a radio frequency from between approximately 5 gigahertz and approximately 40 gigahertz and with an average power density from between approximately 10 milliwatts per square centimeter and approximately 100 milliwatts per square centimeter;
directing the radio frequency along at least one field guiding structure;
exposing a fowl's body to the radio frequency by placing the body adjacent the at least one field guiding structure for a period of time from between approximately 3 seconds and approximately 30 seconds.

9. The method of claim 8 wherein the at least one field guiding structure further comprises a mechanical trough having a plurality of radio frequency coupling ports and at least one field strength concentrating device, selected from a group including: wires, probes, posts, and antennas, thereby reducing the required power level.

10. The method of claim 9 further comprising the step of placing a cylindrical resonator within the mechanical trough prior to passing radio frequency along the trough.

11. The method of claim 8 wherein the at least one field guiding structure is a tube.

12. An incapacitator, comprising: a radio frequency generating source generating a radio frequency from between approximately 5 gigahertz and approximately 40 gigahertz and with an average power density from between approximately 10 milliwatts per square centimeter and approximately 100 milliwatts per square centimeter; wherein the radio frequency generating source is connected to at least one field guiding structure which limits the spatial range of the radio frequency field, and wherein an animal is rendered insensate by placing the animal in close proximity to the field guiding structure for a predetermined period of time.

13. The incapacitator of claim 12 wherein the at least one field guiding structure further comprises at least one pair of parallel guiding plates.

14. The incapacitator of claim 13, further comprising at least one radio frequency coupling structure having an aperture formed in one of the parallel guiding plates.

15. The incapacitator of claim 13 further comprising a plurality of apertures formed in at least one of the parallel guiding plates and wherein at least one radio frequency transmitter is provided at each aperture.

16. The incapacitator of claim 13 further comprising a plurality of apertures formed in at least one of the parallel guiding plates and wherein a single radio frequency transmitter conveys power to the apertures through the use of microwave power splitters.

17. The incapacitator of claim 13 further comprising an animal hanging conveyor for suspending an animal with its body oriented between the parallel guiding plates, wherein the hanging conveyor moves the animal at a predetermined rate of speed to achieve the desired exposure time to the radio frequency.

18. The incapacitator of claim 12 wherein the radio frequency source is a magnetron.

19. The incapacitator of claim 12 wherein the animal exposure time is between approximately 3 seconds and approximately 30 seconds.

20. A method for incapacitating an animal upright and being conveyed with its body oriented between parallel plates and wherein the conveyor moves the upright animal at a predetermined rate of speed to achieve the desired exposure time to a radio frequency and wherein the frequency is within the range from between approximately 5 gigahertz and approximately 40 gigahertz and having an average power density from between approximately 10 milliwatts per square centimeter and approximately 100 milliwatts per square centimeter.

* * * * *